No. 734,826. PATENTED JULY 28, 1903.
H. CSÁNYI.
ELECTRIC BATTERY.
APPLICATION FILED MAR. 4, 1903.
NO MODEL.
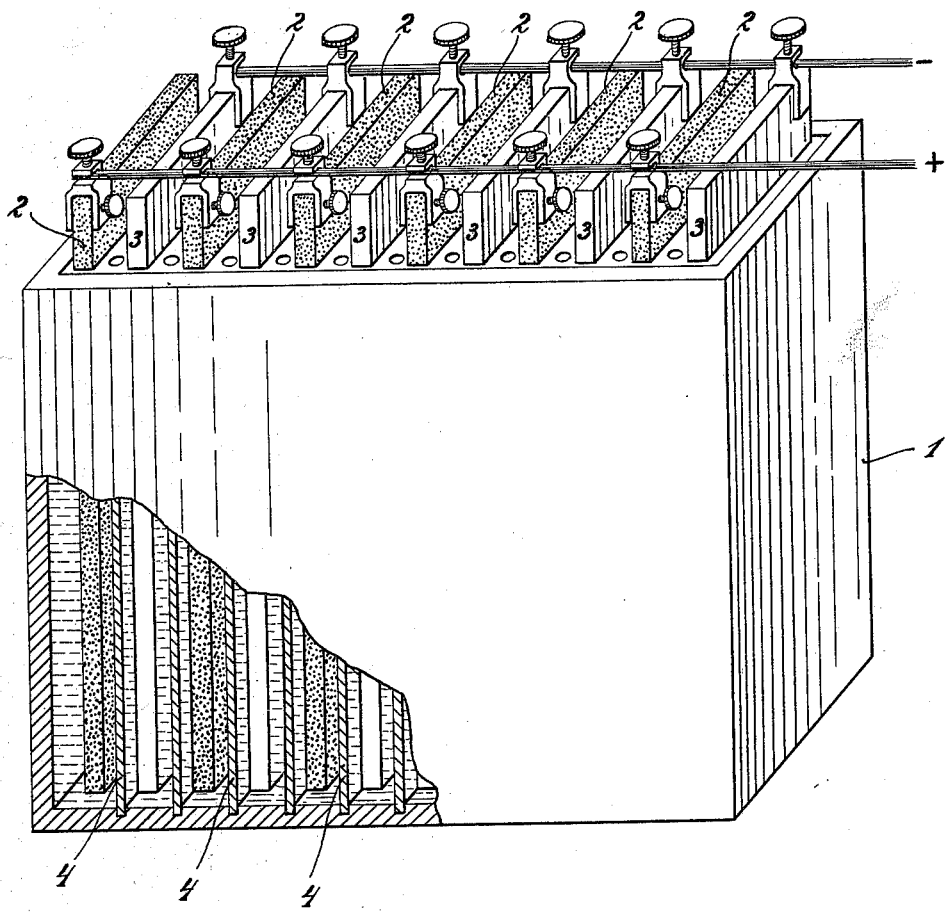
Witnesses:
Henry C. Workman
C. F. Smith
Inventor
Henry Csányi,
By Knight Bros.
Attys No. 734,826. Patented July 28, 1903.

UNITED STATES PATENT OFFICE.

HENRY CSÁNYI, OF FELSÖ-DOBSZA, AUSTRIA-HUNGARY.

ELECTRIC BATTERY.

SPECIFICATION forming part of Letters Patent No. 734,826, dated July 28, 1903.

Application filed March 4, 1903. Serial No. 146,141. (No model.)

*To all whom it may concern:*

Be it known that I, HENRY CSÁNYI, electrical engineer, a citizen of the Kingdom of Hungary, and a resident of Felsö-Dobsza, Abauj-Torna county, Austria-Hungary, have invented certain new and useful Improvements in Electrical Batteries or Elements, of which the following is a specification.

This invention relates to an electrical battery or element in which the solvent electrode or anode is of zinc and the cathode of carbon.

In the accompanying drawing is illustrated a battery or cell composed of a plurality of elements in accordance with the invention.

In said drawing, 1 indicates the jar or cell, which may be constructed of any suitable shape and material—such, for instance, as glass, porcelain, ebonite, or any other non-conducting material.

2 and 3 indicate the electrodes forming one component of the battery, the former of which is of carbon and the second of which is of zinc. A porous partition or diaphragm 4 separates the electrodes.

The carbon electrode is immersed in nitric acid of, for example, 40° to 50° Baumé and the zinc electrode in alcoholic solution of, for example, 5° to 15° Baumé strength of pernitrate of mercury and potassium cyanid. As an example of a suitable composition for said alcoholic solution, the following is given: One thousand grams of alcohol of twenty-five per cent., one hundred and fifty grams of nitric acid of forty-eight per cent., ten grams of oxid of mercury, six grams of potassium cyanid solution of sixty per cent. The depolarizer is separated from the solvent liquid by a very porous diaphragm—for example, a partition of fire-clay or the like—which may be formed of a mixture of clay and pieces of carbon, which latter have been burned by heating the mixture.

Having now particularly described and ascertained the nature of my said invention and in what manner the same is to be performed, I declare that what I claim is—

1. An electrical element or battery the cathode of which is immersed in nitric acid and the anode in an alcohol solution containing pernitrate of mercury and potassium cyanid, the depolarizer being separated from the solvent by means of a diaphragm.

2. An electrical element or battery, the cathode of which is of carbon immersed in nitric acid of from 45° to 50° Baumé, the anode of which is of zinc immersed in an alcoholic solution of pernitrate of mercury and potassium cyanid, said solution having a strength of from 5° to 15° Baumé; the said liquids being separated by a porous diaphragm.

3. An electrical element or battery having a carbon cathode in nitric acid, a zinc anode in an alcoholic solution of nitric acid, oxid of mercury and potassium cyanid, and a porous diaphragm separating said liquids.

In testimony that I claim the foregoing as my invention I have signed my name in presence of two subscribing witnesses.

HENRY CSÁNYI.

Witnesses:
SIGMUND A. HUGO,
LÖW LIPÓT.